United States Patent [19]

Suzuki et al.

[11] Patent Number: 4,935,458

[45] Date of Patent: Jun. 19, 1990

[54] RELEASE AGENT AND COMPOSITE MATERIAL HAVING CURED RELEASE AGENT LAYER

[75] Inventors: Kihachi Suzuki; Makoto Sunakawa; Hiroshi Yamamoto, all of Osaka, Japan

[73] Assignee: Nitto Denko Corporation, Osaka, Japan

[21] Appl. No.: 298,445

[22] Filed: Jan. 18, 1989

[30] Foreign Application Priority Data

Jan. 18, 1988 [JP] Japan .................................... 63-7886
Jan. 18, 1988 [JP] Japan .................................... 63-7887

[51] Int. Cl.$^5$ ............................................. C08J 3/20
[52] U.S. Cl. ........................................ 524/41; 524/46; 524/37; 524/265; 525/100; 106/287.16; 536/68; 536/69; 536/84; 536/99; 536/100
[58] Field of Search ..................... 536/68, 69, 84, 99, 536/100; 525/100; 106/287.16; 524/46, 41, 37, 265

[56] References Cited

U.S. PATENT DOCUMENTS

| | | | |
|---|---|---|---|
| 4,383,062 | 5/1983 | Saad et al. | 524/35 |
| 4,454,266 | 6/1984 | Coughlan et al. | 524/44 |
| 4,714,738 | 12/1987 | Chang et al. | 525/100 |
| 4,764,569 | 8/1988 | Umemoto et al. | 525/100 |

*Primary Examiner*—Melvyn I. Marquis
*Attorney, Agent, or Firm*—Sughrue, Mion, Zinn, Macpeak & Seas

[57] ABSTRACT

A release agent comprising a polyfunctional alkoxysiloxane and an organic compound which is solid at room temperature and contains a functional group capable of reacting with said polyfunctional alkoxysiloxane, and a composite material comprising a substrate and a cured film of the release agent are disclosed. The cured film of the release agent exhibits high strength and excellent release properties without causing blocking or contamination on an adherent.

11 Claims, No Drawings

RELEASE AGENT AND COMPOSITE MATERIAL HAVING CURED RELEASE AGENT LAYER

FIELD OF THE INVENTION

This invention relates to a release agent suitable for polyvinyl chloride substrates, which forms high-strength silicone film excellent in anti-block properties, anti-contamination properties, and adhesion to a substrate. It further relates to a composite material comprising a substrate having a release layer comprising such a release agent.

BACKGROUND OF THE INVENTION

In the production of composite materials comprising a substrate having a release layer provided on at least one side thereof, such as self-adhesive tapes, surface protective sheets, release sheets, etc., the substrate to be used is treated with a release agent in order to facilitate rewinding of a roll or stripping from an adherent surface. Substrates widely employed in these composite materials are polyvinyl chloride-based substrates including a polyvinyl chloride film, a laminate thereof, and a foamed polyvinyl chloride sheet, and paper or a laminate thereof, from the standpoints of excellent heat resistance, weather resistance and mechanical strength.

Conventional release agents applicable to the polyvinyl chloride substrates have been restricted to those comprising condensation type silicones because addition type silicones are inhibited from curing by a stabilizer contained in the polyvinyl chloride substrate. However, since the conventional silicone release layers have low film strength, they are inferior in anti-lock properties, sticking to an adherent through long-term contact therewith, and are hardly peeled off the adherent, or they are transferred to an adherent to cause contamination. Besides, they delaminate due to a plasticizer contained in polyvinyl chloride substrates to easily remove from the substrate simply by light rubbing.

SUMMARY OF THE INVENTION

One object of this invention is to provide a release agent forming a high-strength silicone cured film.

Another object of this invention is to provide a release agent exhibiting satisfactory adhesion to a polyvinyl chloride substrate.

A further object of this invention is to provide a composite material comprising a substrate, particularly a polyvinyl chloride substrate, and a release layer comprising the above-described release agent.

As a result of extensive investigations, it has now been found that the above objects of this invention can be accomplished by a release agent comprising a polyfunctional alkoxysiloxane and an organic compound having a functional group capable of reacting with the polyfunctional alkoxysiloxane and which is solid at room temperature.

A cured film consisting of a polyfunctional alkoxysiloxane alone is hard and brittle and is poor in release performances so that it is not practical for use as a releasability imparting firm. The inventors have proved that a combination of such a polyfunctional alkoxysiloxane and an organic compound which contains a functional group reactive with the polyfunctional alkoxysiloxane and is solid at room temperature forms a cured film having softness, sufficient strength, and improved release properties. The cured film obtained exhibits toughness, anti-block properties, and non-transfer properties (i.e., non-contamination properties) and is thus suitable as a releasability imparting film.

In a preferred embodiment of this invention, the release agent further comprises a high polymeric compound having good adhesion to polyvinyl chloride substrate, the high polymeric compound serving as an adhesive between the alkoxysiloxane film-forming component in the release film and the polyvinyl chloride substrate.

DETAILED DESCRIPTION OF THE INVENTION

The polyfunctional alkoxysiloxane which can be used in the present invention preferably includes those having a plurality of alkoxy groups and capable of curing through condensation on hydrolysis. Typical examples of such polyfunctional alkoxysiloxane include organoalkoxysiloxanes having an alkyl group (e.g., methyl, ethyl, propyl) or a halogen-substituted alkyl group and an alkoxy group (e.g., methoxy, ethoxy); perfluoroalkylalkoxysiloxanes having a long-chain alkyl group terminated with a trifluoromethyl group; and γ-mercaptopropyltrimethoxysiloxane. In addition, alkoxy siloxane compounds useful as surface treating agents, such as coupling agents or hard coatings, are also employable. These polyfunctional alkoxysiloxanes are available as commercial products, for example, X-62-2296 (a tradename, produced by Shin-etsu Chemical Industry Co., Ltd.).

The organic compound which can be used in combination with the polyfunctional alkoxysiloxane is solid at room temperature and contains a functional group capable of reacting with the above-described polyfunctional alkoxysiloxane, e.g., a hydroxyl group and a carboxyl group. Preferred organic compounds are those soluble in a solvent used for the preparation of a release agent.

Examples of the organic compound are cellulose derivatives such as ethers and esters, and hydroxyl-containing alkyl acrylate copolymers. Specific examples of generally used cellulose derivatives are methyl cellulose, ethyl cellulose, benzyl cellulose, trityl cellulose, acetyl cellulose, and cellulose propionate. Generally used hydroxyl-containing alkyl acrylate copolymers include copolymers comprising an alkyl (meth)acrylate containing a hydroxyl group (e.g., 2-hydroxyethyl acrylate, 2-hydroxyethyl methacrylate, 2-hydroxypropyl acrylate, 2-hydroxypropyl methacrylate, diethylene glycol monoacrylate, diethylene glycol monomethacrylate, triethylene glycol monoacrylate, and triethylene glycol monomethacrylate) and an alkyl (meth)acrylate having from 1 to 8 carbon atoms in the alkyl moiety thereof.

These organic compounds are usually used in an amount ranging from 50 to 1,000 parts by weight, and preferably from 100 to 800 parts by weight, per 100 parts by weight of the polyfunctional alkoxysiloxane. Amounts less than 50 parts are insufficient for ensuring softness of a cured film, while amounts exceeding 1,000 parts reduce release performances of a cured film.

A cured film comprising the above-described polyfunctional alkoxysiloxane and organic compound usually has a film strength of 50 kg/cm$^2$ or higher, and particularly between 100 and 300 kg/cm$^2$, in terms of tensile strength (20° C.; pulling speed: 300 mm/min; chuck distance: 10 mm; and hereinafter the same).

If desired, the release agent according to the present invention may further contain an organosiloxane having a hydroxyl group at both terminals thereof, e.g., dimethylsiloxane. In this case, a cured film obtained therefrom has a film strength of about 50 kg/cm². The combined use of the organosiloxane having a hydroxyl group at the both terminals is effective to further improve release properties to facilitate rewinding. In particular, when dimethylsiloxane is used in combination, the resulting cured film exhibits improved slip properties and is therefore preferred for use in composite materials such as surface protective sheets which are frequently required to have slip properties during fabrication such as cutting.

The dimethylsiloxane having a hydroxyl group at both terminals thereof is available a commercial products having a number average molecular weight of 5,000 to 150,000, for example, under a tradename of X-62-2295 (product of Shin-etsu Chemical Industry Co., Ltd.).

It is recommended to use such an organosiloxane in an amount of from 50 to 500 parts by weight per 100 parts by weight of the polyfunctional alkoxysiloxane, taking into consideration its specific properties of reducing film strength while retaining satisfactory anti-block properties or non-contamination properties and improving release properties or slip properties.

The release agent of the invention is usually prepared in the form of a mixed solution of the above-described components in an appropriately selected solvent. If desired, a curing catalyst, e.g., an organotin compound such as dibutyltin diacetate, dibutyltin dilaurate, etc., may be added to the solution in a recommended amount of from 2 to 20% by weight based on the total silicone components. In order to facilitate control of film properties through acceleration of curing, a curing accelerator, e.g., methylhydrosiloxane, may also be added, if desired, in a recommended amount of from 1 to 10% by weight based on the total silicone components.

The release agent of the present invention is coated on at least one side of a substrate (e.g., plastic films and paper) which is used for composite materials, such as adhesive tapes, surface protective sheets, and release tapes, in a usual manner and then dried to form a cured film. A coating amount of the release agent on the substrate ranges from 0.02 to 1.0 g/m² and preferably 0.1 to 0.7 g/m² on a solid basis. If amount is less than 0.02 g/m², the resulting cured film tends to fail to exhibit sufficient release properties or tends to be transferred to an adherent due to poor adhesion to the substrate, resulting in contamination of the adherent. If the coating amount exceeds 1.0 g/m², the cured film is liable to be transferred to an adherent or to be removed from a substrate by rubbing friction.

In cases where the cured film of the release agent is inferior in adhesion to a substrate, the adhesion can be improved by previously treating the surface of the substrate with a surface treating agent showing good adhesion to both the cured film and the substrate, such as a copolymer comprising a constituting component of the cured film and a constituting component of the substrate. In the present invention, the improvement of adhesion to a substrate can also be achieved by incorporating the above-described copolymer into the release agent. When, in particular, the release agent is applied to a polyvinyl chloride substrate it sometimes happens that the cured film delaminates from the substrate due to a plasticizer in the polyvinyl chloride and is easily removed therefrom by light rubbing. In such a case, it is preferable to incorporate into the release agent a polymeric compound having good adhesion to a polyvinyl chloride substrate. The polymeric compound to be used includes, for example, copolymers mainly comprising an alkyl (meth)acrylate having from 1 to 8 carbon atoms in the alkyl moiety thereof and urethane-vinyl chloride copolymers. In the cured film obtained from this release agent, the alkoxysiloxane component is orientated in the surface side, while the polymeric compound is orientated in the side facing with the substrate, whereby the polymeric compound functions as an adhesive to achieve satisfactory adhesion between the substrate and the cured film.

Of the above-described alkyl (meth)acrylate copolymers, particularly preferred are those containing methyl methacrylate as a copolymer component. Of the urethane-vinyl chloride copolymers, typically employed are those containing a urethane linkage unit (—NH-COO—) derived, e.g., from ethyl carbamate, and a vinyl chloride unit per molecule, the vinyl chloride unit content ranging from 20 to 70% by weight. These urethane-vinyl chloride copolymers are commercially available under tradenames of VS-4001, VS-4003 and VS4021 (all produced by Toa Gosei Chemical Industry Co., Ltd.). The urethane-vinyl chloride copolymer may further comprise (meth)acrylic acid or a hydroxylethyl ester thereof, which has a functional group such as a carboxyl group and a hydroxyl group, as a copolymer component.

A suitable amount of such a polymeric compound ranges from 10 to 100 parts by weight per 100 parts by weight of the sum of the polyfunctional alkoxysiloxane and the organic compound having functional group capable of reacting with the polyfunctional alkoxysiloxane and which is solid at room temperature, and, if used, the organosiloxane having a hydroxyl group at the both terminals.

The cured film obtained from the release agent containing the above-described polymeric compound has a film strength of about 50 kg/cm² or more.

The release agent in accordance with the present invention provides a high-strength silicone film comprising an alkoxysiloxane, which exhibits release performances, excellent anti-block properties, and excellent non-contamination properties.

The present invention is further advantageous in that improvements on adhesion to a substrate, release properties or slip properties of a cured film can be achieved by a simple and easy operation of adding a necessary additive to the release agent.

The present invention is now illustrated in greater detail with reference to the following Examples, but it should be understood that the present invention is not deemed to be limited thereto. In these examples, all the parts, percents, and ratios are by weight unless otherwise specified.

EXAMPLE 1

Ten parts of a polyfunctional methoxysiloxane represented by formula:

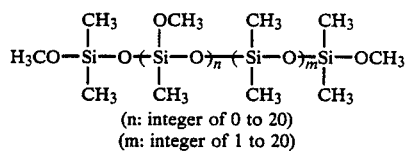

(n: integer of 0 to 20)
(m: integer of 1 to 20)

60 parts of ethyl cellulose, and 1 part of an organotin compound were dissolved in a mixed solvent of toluene and ethyl acetate to prepare a 2% release agent solution.

EXAMPLE 2

A release agent was prepared in the same manner as in Example 1, except for increasing the amount of the organotin compound to 2 parts, and further adding 25 parts of dimethylsiloxane having a hydroxyl group at both terminals thereof and 2 parts of methylhydrosiloxane.

EXAMPLE 3

Five parts of the same polyfunctional methoxysiloxane as used in Example 1, 15 parts of ethyl cellulose, 10 parts of a butyl acrylate/methyl meth- acrylate/2-hydroxyethyl acrylate copolymer (40/60/10), and 1 part of an organotin compound were dissolved in toluene to prepare a 5% release agent solution.

EXAMPLE 4

A release agent solution was prepared in the same manner as in Example 2, except for further using 20 parts of a butyl acrylate/methyl methacrylate/2hydroxyethyl acrylate copolymer (50/50/2).

EXAMPLE 5

Ten parts of the same polyfunctional methoxysiloxane as used in Example 1, 40 parts of ethyl cellulose, 25 parts of dimethylsiloxane having a hydroxyl group at the both terminals, 40 parts of a methyl methacrylate/2-hydroxyethyl acrylate copolymer (100/5), 2 parts of an organotin compound, 1 part of methylhydrosiloxane, and 10 parts of dioctyl phthalate were dissolved in toluene to prepare a 3% release agent solution.

EXAMPLE 6

Ten parts of the same polyfunctional methoxy siloxane as used in Example 1, 50 parts of ethyl cellulose, 20 parts of dimethylsiloxane having a hydroxyl group at the both terminals, 15 parts of a butyl acrylate/methyl methacrylate/2-hydroxyethyl acrylate copolymer (40/60/10), 3 parts of an organotin compound, and 1 part of methylhydrosiloxane were dissolved in toluene to prepare a 5% release agent solution.

EXAMPLE 7

A release agent was prepared in the same manner as in Example 6, except for replacing the acrylate copolymer with a urethane/vinyl chloride copolymer having a vinyl chloride unit content of 50%.

EXAMPLE 8

Ten parts of the same polyfunctional methoxysiloxane as used in Example 1, 80 parts of ethyl cellulose, 35 parts of polydimethylsiloxane having a hydroxyl group at both terminals thereof, 60 parts of a butyl acrylate/methyl methacrylate/2-hydroxyethyl acrylate (40/60/5), 3 parts of an organotin compound, and 2 parts of methylhydrosiloxane were dissolved in toluene to prepare a 3% release agent solution.

Each of the release agents prepared in Examples 1 to 8 was evaluated according to the following test methods. For comparison, the same evaluations were made on a commercially available condensation type silicone release agent (KS-705, a tradename of Shin-etsu Silicone Co., Ltd.) (Comparative Example 1) and a composition comprising KS-705 and an acrylic resin as described in U.S. Pat. No. 4,362,833 (Comparative Example 2). The results of the evaluations are shown in Table 1.

(1) Film Strength:

The sample release agent was coated on a release sheet in a dry thickness of 30 $\mu$m. After drying, the cured film was peeled off and cut to a width of 10 mm to measure a tensile strength (20° C.; pulling speed: 300 mm/min; chuck distance: 10 mm).

(2) Peel Strength:

The sample release agent was coated on a substrate and dried to obtain a release sheet. A 2 kg rubber roller was once moved on the release layer back and forth to adhere a rubber adhesive tape. The force required for peeling the adhesive tape off the substrate (peel angle: 180° ; pull speed: 300 mm/min) was measured.

The substrate used was a 25 $\mu$m thick polyester film in Examples 1 and 2 and a 70 $\mu$m thick polyvinyl chloride film in other Examples. The coating amount (solids content) of the release agent was 0.2 g/m$^2$ in Examples 1 and 2; 0.3 g/m$^2$ in Examples 3, 6, 7 and 8; 0.1 g/m$^2$, 0.5 g/m$^2$ and 0.7 g/m$^2$ in Example 4; 0.2 g/m$^2$ in Comparative Example 1; and 0.3 g/m$^2$ in Comparative Example 2.

(3) Anti-Block Properties:

The sample release agent was coated on the same substrate as used in (2) above in the same coating amount (solids content) as in (2) above, followed by drying to obtain a release sheet. A 10 $\mu$m thick rubber adhesive layer was provided on the side opposite to the release layer to obtain a surface protective sheet.

The release layer of the surface protective sheet and a 0.4 mm thick BA stainless steel plate (SUS 304) were contacted and bonded under a pressure of 2 kg/cm$^2$ at 60° C. and 90% RH for 24 hours. The peel force required for peeling the release sheet was measured (peel angle: 180° ; pull speed: 300 mm/min).

(4) Non-Contaminous Properties:

After testing anti-block properties as described above, contamination of the BA stainless steel plate due to transfer of the cured film was examine by visual observation.

TABLE 1

| Example No. | Film Strength (kg/cm) | Peel Strength (g/20 mm) | Anti-Block Properties (g/50 mm) | Non-Contamination Properties |
|---|---|---|---|---|
| Example 1 | 240 | 35 | 5 | not observed |
| Example 2 | 220 | 15 | 5 | " |
| Example 3 | 210 | 35 | 5 | " |
| Example 4 | 150 | 20 | 5 | " |
| Example 5 | 100 | 25 | 5 | " |
| Example 6 | 110 | 20 | 5 | " |
| Example 7 | 80 | 20 | 5 | " |
| Example 8 | 100 | 20 | 5 | " |
| Comparative Example 1 | 25 | 15 | 55 | Widely observed |
| Comparative Example 2 | 10 | 20 | 50 | Widely observed |

Further, each of the samples obtained in Examples 1 to 8 and Comparative Examples 1 and 2 was evaluate for formability as follows. A surface protective sheet was prepared in the same manner as described in (3) above. The rubber adhesive surface of the protective sheet was stuck to the same. A stainless steel plate as used in (3) above. The thus protected stainless steel plate was subjected to draw forming by the use of a 60 t press tool to obtain a forming having a diameter of 100 mm and a draw depth of 25 mm. The formability was judged in terms of the degree of breakage of the substrate. As a result, no breakage of the substrate was observed in any of the samples treated with the release agent obtained in Examples 2 and 4 to 8 owing to the slip properties of the release layer.

While the invention has been described in detail and with reference to specific embodiments thereof, it will be apparent to one skilled in the art that various changes and modifications can be made therein without departing from the spirit and scope thereof.

What is claimed is:

1. A release agent comprising: a polyfunctional alkoxysiloxane represented by general formula (I)

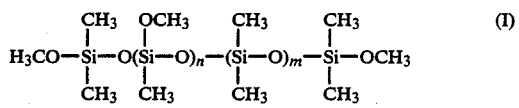

where
n is an integer of 0 to 20, and
m is an integer of 1–20; and
a cellulose derivative which is solid at room temperature and contains a functional group capable of reacting with said polyfunctional alkoxysiloxane.

2. A release agent as claimed in claim 1, wherein said polyfunctional alkoxysiloxane has a plurality of alkoxy groups and is capable of curing by condensation on hydrolysis.

3. A release agent as claimed in claim 1, wherein said cellulose derivative contains a hydroxyl group or a carboxyl group.

4. A release agent as claimed in claim 1, wherein said cellulose derivative is present in an amount of from 50 to 1,000 parts by weight per 100 parts by weight of the polyfunctional alkoxysiloxane.

5. A release agent as claimed in claim 1, wherein said release agent further comprises an organosiloxane having a hydroxyl group at both terminals thereof.

6. A release agent as claimed in claim 5, wherein said organosiloxane is dimethylsiloxane.

7. A release agent as claimed in claim 5, wherein said organosiloxane is present in an amount of from 50 to 400 parts by weight per 100 parts by weight of the polyfunctional alkoxysiloxane.

8. A release agent as claimed in claim 1, wherein said release agent further comprises
a copolymer comprising an alkyl acrylate or methacrylate having from 1 to 8 carbon atoms in the alkyl moiety thereof or a urethane-vinyl chloride copolymer.

9. A release agent as claimed in claim 8, wherein said copolymer is present in an amount of from 10 to 100 parts by weight per 100 parts by weight of the sum of said polyfunctional alkoxysiloxane and said cellulose derivative.

10. A release agent as claimed in claim 1, wherein said release agent further comprises:
an organosiloxane having a hydroxyl group at both terminals thereof and
a copolymer comprising an alkyl acrylate or methacrylate having from 1 to 8 carbon atoms in the alkyl moiety thereof or a urethane-vinyl chloride copolymer.

11. A release agent as claimed in claim 10, wherein said copolymer is present in an amount of from 10 to 100 parts by weight per 100 parts by weight of the sum of said polyfunctional alkoxysiloxane, said cellulose derivative and said organosiloxane having a hydroxyl group at both terminals thereof.

* * * * *